United States Patent Office 3,224,289
Patented Dec. 21, 1965

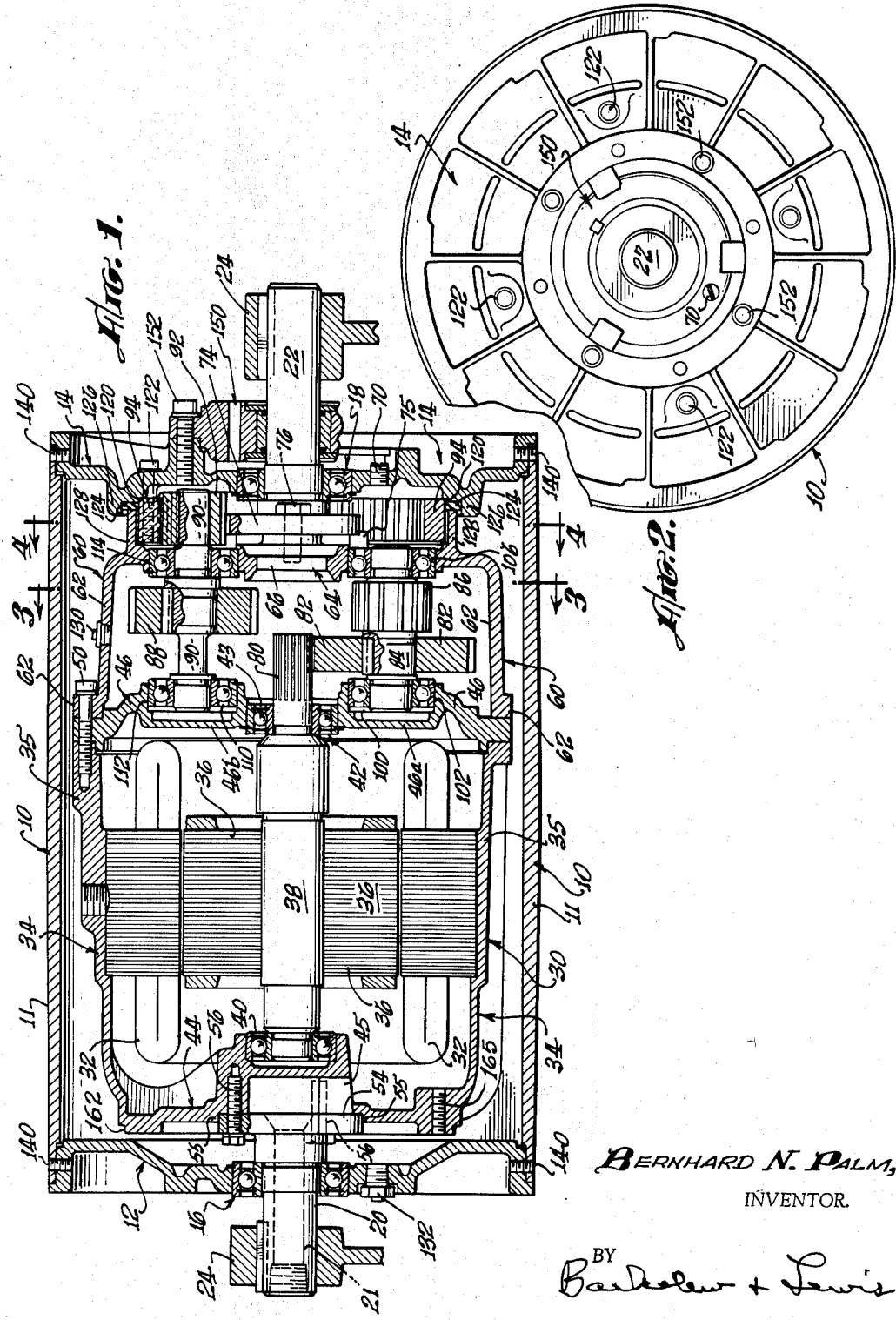

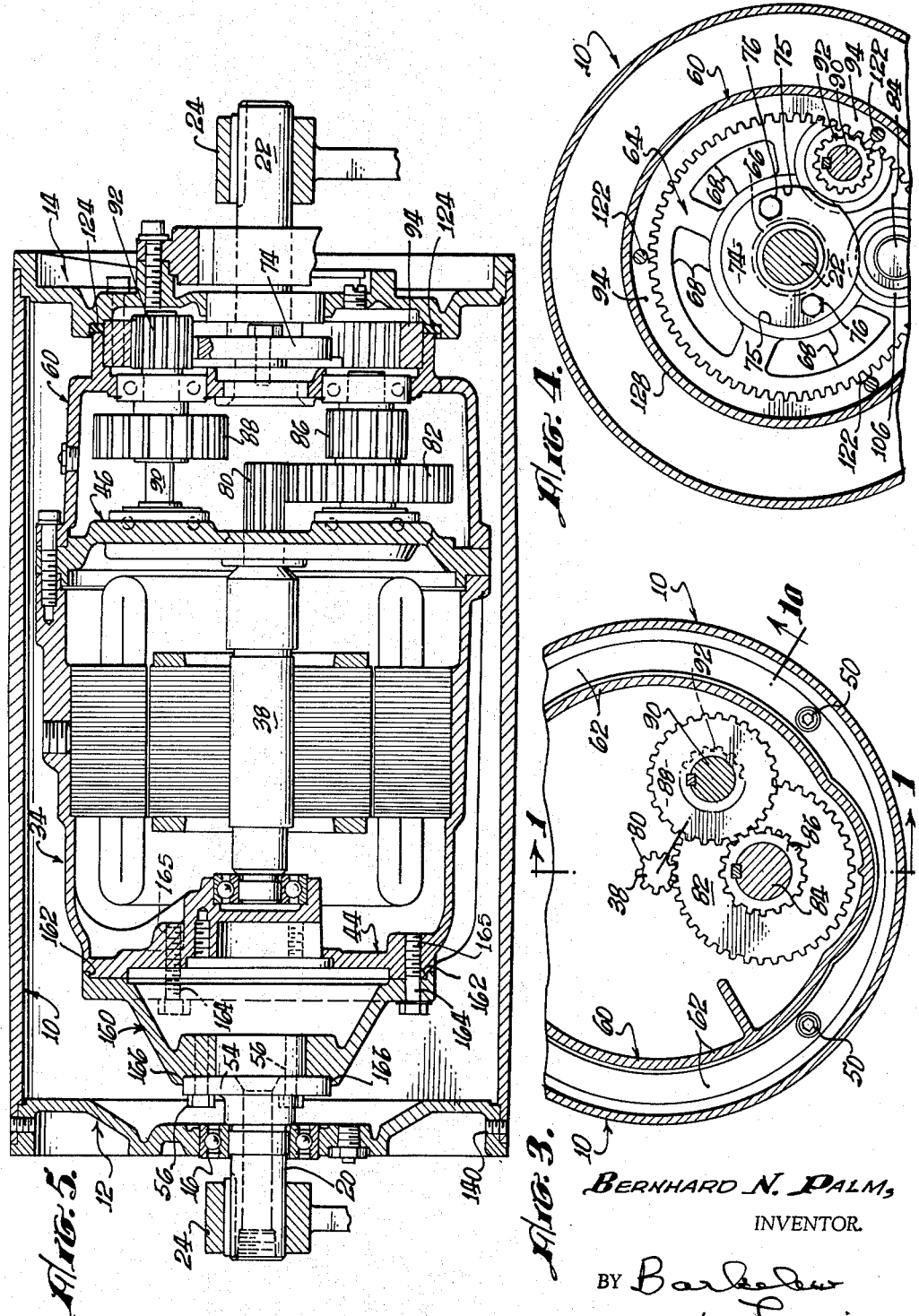

3,224,289
MOTORIZED HEAD PULLEY
Bernhard N. Palm, Newport Beach, Calif., assignor to Electra Motors, Inc., Anaheim, Calif., a corporation of California
Filed Dec. 3, 1962, Ser. No. 241,799
9 Claims. (Cl. 74—421)

The present invention relates to improvements in motorized head pulleys—devices of the type having a hollow rotatable member adapted to take and drive a mechanism element external of that member, such as, for instance, a conveyor belt, said rotatable hollow member being driven by a motor or other prime mover located within it. For driving a belt the hollow rotatable member is in the form of a drum, its external surface being fitted for whatever type of belt it is to drive. As shown here as an illustration the external surface is substantially cylindric to drive a flat conveyor belt, but it may be of any other form, or carry any driving element suitable to the desired driving purpose.

The improvements of the invention have to do more particularly with the driving train between the prime mover and the illustrative drum, and the relation of that driving train to the motor and drum; and with provisions for ready adaptation of the driven drum or other external driving member to various situations that require different axial lengths of that member, as, for example, the driving of conveyor belts of different widths.

These improvements and other related ones will be best understood from the following descriptions of preferred embodiments illustrative of the invention and shown in the accompanying drawings, in which:

FIG. 1 is a longitudinal section of one illustrative embodiment, that section being taken partially on each of the two lines 1—1 and 1a on FIG. 3;

FIG. 2 is an end view of the embodiment shown in FIG. 1, but omitting the back-up preventer 150 shown in that figure;

FIGS. 3 and 4 are sections respectively on lines 3—3 and 4—4 of FIG. 1; and

FIG. 5 is a longitudinal section similar to that of FIG. 1, and showing preferred and illustrative provisions for change of drum length.

Referring first to FIGS. 1 to 4, the external hollow driven member is there illustratively shown as a drum 10 with outer cylindric wall 11 and end walls 12 and 14 carried, respectively, on bearings 16 and 18 concentric with cylindric wall 10. Bearings 16 and 18 are mounted, respectively, on trunnions 20 and 22, and concentric therewith; which trunnions are associated with the interior driving mechanism as described below and are each held stationarily and non-rotatively in a frame which includes the mounting brackets shown at 24.

Driving motor 30, illustrated here as an induction motor with stator windings 32 in outer motor casing 34, has its rotor 36 mounted on motor drive shaft 38. That drive shaft is mounted is bearings 40, 42, carried, respectively, in end wall 44 and end wall 46 of the motor casing. As shown here, end wall 44 is integral with the main surrounding body 35 of the motor casing 34, while end wall 46 is peripherally secured in tight relation to casing body 35 by a suitable set of cap screws 50.

Trunnion 20, the one at the left in FIG. 1, has a flange 54 at its inner end, inside the drum end-wall bearing 16, that flange being concentrically shouldered at 55 and rigidly secured on motor casing end-wall 44 by a set of cap screws 56. As shown here, trunnion 20, thus rigidly secured directly to the motor casing, is located co-axially with that casing and the motor drive shaft 38. An axial opening 21 in trunnion 20 and an opening at 45 in casing end wall 44 afford passage for a power supply cable to the stator windings.

Motor casing end wall 46 (the one at the right in FIG. 1) is effectively imperforate and impervious to the passage or leakage of lubricant from the gear containing parts of the mechanism into the interior of the motor case. As is later pointed out in particular, the only opening through that end wall 46 is the one in which motor shaft bearing 42 is mounted; and that bearing is provided with seals 43 which not only hold in its grease charge but also make it substantially impervious to any passage of lubricant into the motor casing.

A motor casing extension 60 is secured rigidly to the motor casing with its peripherally flanged wall 62 held tightly rigidly against end wall 46 by the set of cap screws 50. Extension 60 has a hollow encompassing circular, and substantially cylindric or tubular, wall 62, open at its flanged end at the motor casing end-wall 46 and carrying at its other end (right-hand end in FIG. 1) an end formation 64 which, as shown here, is perforate and, in effect, a spider. Its perforations may include, for example, a central opening 66, and several surrounding openings such as 68 shown in FIG. 4. The outer surrounding extension wall 62 is imperforate. The purpose of the openings through the extension end formation 64 is to allow free and open communication for lubricant flow between the space to the right of 64 and the space inside extension wall 62. As will be noted later, lubricant is introduced into the space between drum end-wall 14 and the extension spider formation 64 through the plugged opening at 70 in that drum end-wall. Drum end-wall 14 is spaced from extension spider formation 64 and a part of the driving gear train between the motor drive shaft and the drum is located in that space.

Trunnion 22 (the one to the right in FIG. 1) carries a flange 74 on its iner end, to the left of drum end wall bearing 18, and that flange is concentrically shouldered as indicated at 75 and rigidly secured on extension spider formation 64 by cap screws such as indicated at 76. The rigid assembly of trunnion 22 with the motor casing extension 60 alines that trunnion co-axially with the motor casing and motor drive shaft 38.

The driving gear train between the motor shaft and the drum is here shown typically as involving a spur gear formation 80 on motor shaft 38, driving a gear 82 on counter shaft 84, a spur gear 86 on counter shaft 84 driving a gear 88 on counter shaft 90, and a spur gear 92 on that counter shaft 90 driving an internally toothed ring gear 94 secured to drum end wall 14.

Counter shaft 84 is carried at one end (left end) in bearing 100 held in a circular seat 102 in motor casing end wall 46, with that circular seat closed to the left of the bearing by wall portion 46a. The other end (right end) of counter shaft 84 is carried in a bearing 106 mounted in the extension spider formation 64. Gear 82 and spur 86 are both located between motor casing end-wall 46 and the extension formation 64.

Counter shaft 90 is mounted at one end (left end) in bearing 110 in a seat 112 in motor casing end wall 46, that seat being closed at the left by wall portion 46b. Shaft 90 is carried near its other end (right end) by the bearing 114 mounted in the extension formation 64. Gear 88 on counter draft 90 is located between motor case end wall 46 and the extension formation 64. Shaft 90 projects through bearing 114 and, at its right end, carries spur gear 92 in the space between extension formation 64 and drum end wall 14.

The internally toothed ring gear 94, driven by spur 92, is rigidly carried on drum end wall 14 and held to that end wall, inside a centering shoulder 120, by a set of cap screws 122. As seen in FIG. 1, ring gear 94 projects axially (to the left) from end wall 14 and from its centering shoulder 120. To the left of that centering shoulder the ring gear is surrounded by a lubricant sealing ring 124 confined at its outer periphery by a shoulder 126 on the drum end wall 14. An extension of extension wall 62 in the form of a circular flange 128, projecting to the right from the extension spider formation 64, rides against that sealing ring 124. The contact of that flange 128 with the sealing ring is such as to provide, with a low coefficient of friction, a complete seal preventing escape of lubricant outwardly, into the space inside drum wall 11, from the gear containing space inside extension wall 62, 128, and between motor casing end wall 46 and drum end wall 14. The extension flange 128, riding on sealing ring 124, is, in full effect, an imperforate part of extension wall 62.

From the preceding description, it will be understood that the whole motor casing with its extension 60 is held rotatively stationary by the stationarily held trunnions 20 and 22 attached rigidly to the motor casing and its extension. The driven drum end-wall 14, by its seal at 124, seals off the gear containing space inside the motor casing extension wall 62, 128. For operation, the space within that extension wall, and between motor case end wall 46 and drum end wall 14, is filled about half full of lubricant through the plugged opening 70 in the drum end wall. That space being sealed, no lubricant can escape either into the motor or into the space around the motor casing inside the drum. As shown here, peripheral drum wall 11 and left-hand end wall 12 of the drum are imperforate. However, it is only necessary that the right-hand drum end wall 14 be effectively imperforate, inside the annular seal at 124, and that bearing 18 be sealed, to prevent lubricant escape. Drum walls 11 and 12 may be perforate if desired; but are preferably also imperforate, as is also the outer part of end wall 14, to exclude dust, etc. To prevent any excessive pressure rise in the lubricant space due to heating in operation—a pressure rise that might tend to force lubricant past the seal 124 or through bearings 42, 18—a pressure relief valve, of known structure, is mounted in the upper part of wall 62 at 130. Another pressure relief valve at 132 in drum end wall 12, set to relieve at the same pressure, then assures that pressure outside the motor casing cannot rise above that in the lubricant space.

Various driven drum speeds are obtained by substituting motors of various rotative speeds and by substituting for spur 86 and gear 88 others of different gear ratios. To make such substitutions, after the trunnions have been removed from their supports 24, one or both drum end walls may be removed from the enclosing drum wall 11 by removing the screws 140 that hold those walls together. Removal of drum end wall 14 allows the whole motor and gearing assembly to be pulled out. Then the motor casing extension with its contained gearing can be removed to make any desired changes in motor or gearing ratio.

FIG. 1 shows a back-up prevention brake at 150, of known structure, attached at 152 to drum end wall 14 and acting on trunnion 22 to prevent back-up rotation of the drum where that prevention may be desirable.

FIG. 5 shows the left-hand portion of the mechanism of FIGS. 1 to 4 adapted to drums of different axial lengths. In FIG. 5, trunnion 20 has been removed from its attachment, as in FIG. 1, directly to motor casing end wall 44, and a hollow conical extension adapter 160, concentrically shouldered at 162, is rigidly secured at its flanged larger end to the outer peripheral part of motor casing end-wall 44 by a set of cap screws 164 set in threaded bores 165 in that part of the motor casing end wall. The smaller end (left hand in FIG. 5) of adapter 160 takes the flange 54 of trunnion 20, concentrically shouldered at 166 and rigidly held by the same cap screws 56 in the same lay-out as in FIG. 1. Bearing 16 and its drum end wall 12, the same as in FIG. 1, are mounted in the same position on trunnion 20 as in FIG. 1, but now spaced further from motor casing end wall by the axial length of adapter 160. Thus a drum of that additional axial length is accommodated.

I claim:
1. An internally driven pulley comprising the combination of
 a prime mover having an external casing with end walls and an axially extending driving shaft projecting through one end wall,
 a trunnion rigidly connected to and projecting axially from the other end wall of the prime mover casing,
 a hollow casing extension having a generally tubular wall rigidly and sealingly secured at one tubular end to said one end of the prime mover casing and projecting axially from that end of the prime mover casing, said tubular wall being effectively imperforate,
 a perforate end formation rigidly attached to and extending across the axial end portion of said tubular wall that is remote from the prime mover casing,
 a second trunnion rigidly secured to said perforate end formation and extending axially therefrom on an axis common to the axis of the first mentioned trunnion,
 at least one of said trunnions adapted to be held stationarily,
 a hollow axially extending pulley member surrounding the prime mover and having mounting elements at its axial ends journalled on said trunnions,
 the mounting element that is journalled on the second mentioned trunnion having an annular lubricant sealing contact with said last mentioned end of the tubular extension wall,
 at least that portion of said mounting element within its annular sealing contact being effectively imperforate except for its journalling on the second trunnion,
 a driving gear driven by the prime mover driving shaft,
 a driven gear attached to the internal side of the last mentioned mounting element within said annular sealing contact,
 and a driving gear train operatively extending between the driving and driven gears and carried for rotation in bearings mounted on the said one casing end wall and on said perforate formation that extends across the end portion of said tubular extension wall.

2. The combination defined in claim 1, and in which said one end wall of the prime mover casing is imperforate except for the extension of the driving shaft through it.

3. The combination defined in claim 1 and in which
 the prime mover casing is effectively imperforate except for the projection of the driving shaft through said one end wall,
 the axially extending hollow pulley member is effectively imperforate and the mounting element that is journalled on the first mentioned trunnion is effectively imperforate except for its journalling on that trunnion,
 a pressure release from the space enclosed by the tubular casing extension wall to the interior of the hollow pulley member,
 and a pressure release from the interior of said pulley member extending through one of said mounting elements.

4. The combination defined in claim 1, and in which said driven gear is in the form of an annular internally toother ring gear secured to said last mentioned mounting element within said annular sealing contact.

5. The combination defined in claim 4, and in which said tubular extension wall is circular and said ring is co-axial with said circular casing extension wall,
 in which the open end of said casing extension wall surrounds said ring gear,
 and in which said annular sealing contact is formed by a sealing ring surrounding said ring gear and contacted axially by a surface on said last mentioned mounting element and an end surface of said casing extension wall.

6. The combination defined in claim 4, and in which both said ring gear and the gear of the driving train that meshes with said ring gear lie between said last mentioned mounting element and the perforate formation that extends across said end portion of the tubular casing extension wall.

7. The combination defined in claim 1 and in which
said perforate end formation is axially spaced from the mounting element that is journalled on the second mentioned trunnion,
and in which the driving gear train includes gearing mounted on shafts extending between and journalled on said prime mover casing and said perforate end formation,
one of said shafts extending through said perforate formation and the driving gear train including a gear on said one shaft and lying in the space between said perforate formation and said last mentioned mounting element and meshing with the driven gear.

8. The combination defined in claim 1, and including also a removable and substitutable axial extension member secured directly to said other end wall of the prime mover casing,
said first mentioned trunnion being secured directly to the outer end of said extension member.

9. An internally driven pulley comprising the combination of
a prime mover having an external casing with end walls and an axially extending driving shaft projecting through one end wall,
a trunnion rigidly connected to and projecting axially from the other end wall of the casing,
a hollow casing extension rigidly secured to and projecting axially from said one end of the casing,
a second trunnion rigidly connected to said casing extension and extending axially therefrom on an axis common to the axis of the first mentioned trunnion,
at least one of said trunnions adapted to be held stationarily,
a hollow axially extending pulley member surrounding the prime mover and having mounting elements at its axial ends journalled on said trunnions,
a driving gear driven by the prime mover driving shaft,
a driven gear attached to the mounting element that is journalled on the second mentioned trunnion,
a driving gear train operatively extending between the driving and driven gears,
a removable and substitutable axial extension member secured directly to said other end wall of the prime mover casing,
said first mentioned trunnion being secured directly to the outer end of said extension member.

References Cited by the Examiner
UNITED STATES PATENTS

| | | | |
|---|---|---|---|
| 2,540,099 | 2/1951 | Christian | 74—421.5 |
| 2,736,209 | 2/1956 | Christian | 74—421.5 |
| 2,966,068 | 12/1960 | Christian | 74—421.5 |

DON A. WAITE, *Primary Examiner.*